UNITED STATES PATENT OFFICE.

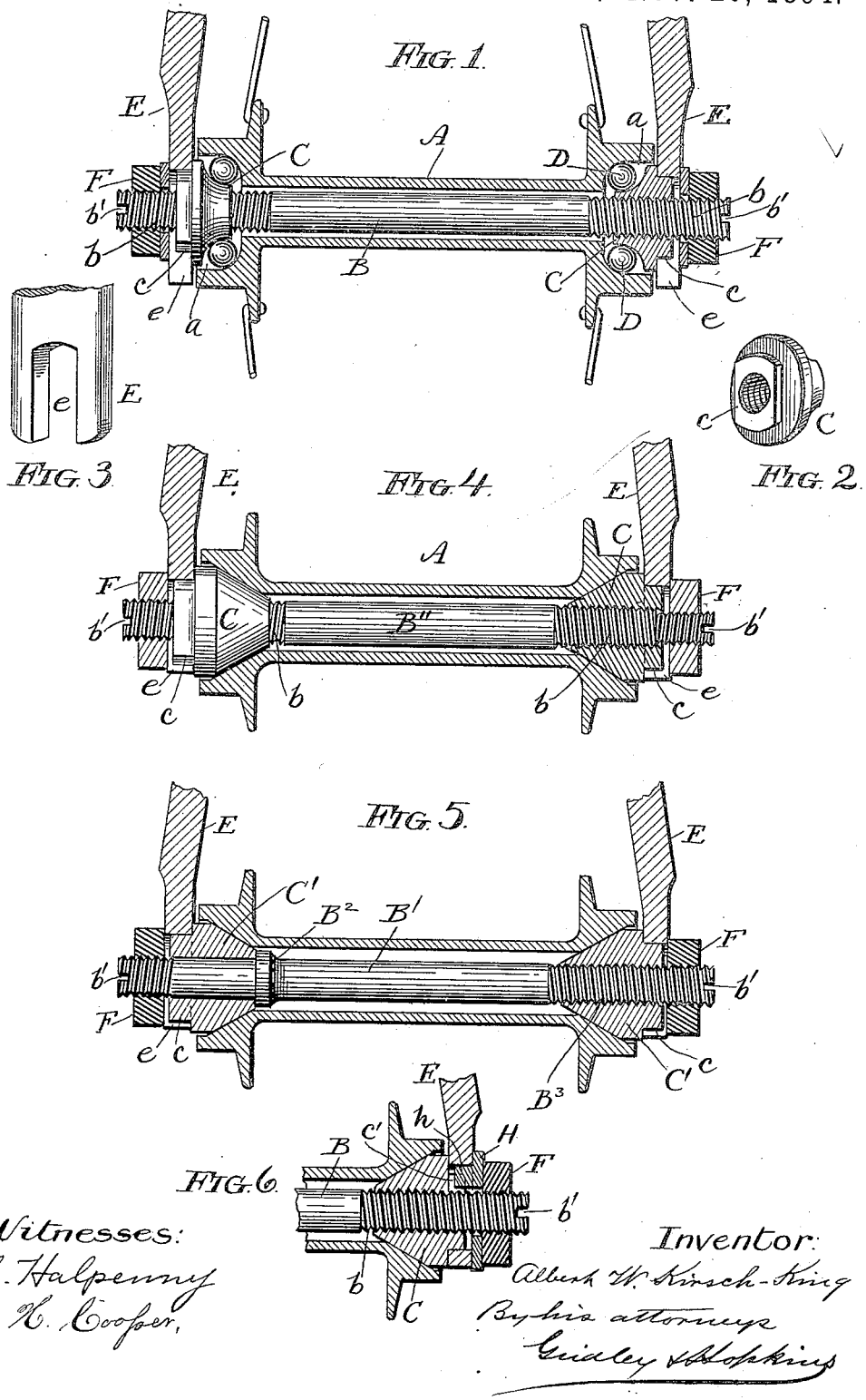

ALBERT W. KIRSCH-KING, OF CHICAGO, ILLINOIS, ASSIGNOR OF ONE-HALF TO THE FRAZIER CYCLE COMPANY, OF SAME PLACE.

JOURNAL-BEARING.

SPECIFICATION forming part of Letters Patent No. 529,554, dated November 20, 1894.

Application filed May 27, 1893. Serial No. 475,746. (No model.)

*To all whom it may concern:*

Be it known that I, ALBERT W. KIRSCH-KING, a citizen of the United States, residing at Chicago, in the county of Cook and State of Illinois, have invented certain new and useful Improvements in Journal-Bearings, of which the following is a specification, reference being had to the accompanying drawings, which are made a part hereof, and in which—

Figure 1 is an axial section of a journal bearing embodying the invention and illustrating its application to the wheel of a velocipede. Fig. 2 is a perspective view showing one of the cones. Fig. 3 is a similar view of the lower end of one side of the fork. Figs. 4 and 5 are axial sections of journal bearings embodying the invention under two modifications. Fig. 6 is a view of a modification.

In the drawings A represents the hub of the wheel having at each end a socket $a$, provided with a ball race.

B represents the axle, and C C the cones, each provided with a ball race. These cones are screwed onto the axle, which, for the purpose, is provided with right and left threads, as shown at $b\ b$, and between them and the hub are interposed a number of anti-friction balls D. The outer face of each of the cones is provided with a projection $c$, which is of non-circular shape and fits in a notch or opening $e$, of corresponding shape, formed in the lower end of fork E.

F F are lock nuts turned onto the threaded portions of the axle, and bearing against the outer faces of the two prongs of the fork. The projections $c$ are less in length than the thickness of the portion of the fork which engages them, and as a consequence, when the nuts are tightened the prongs of the fork are clamped between said nuts and the outer faces of the cones.

The present invention relates to that class of bearings in which the cones are absolutely prevented from any rotation when once put in place, and are adjusted toward and from each other by means of an axle which has no contact with any part of the bearing that is capable of rotating, and the invention consists in the features of novelty that are particularly pointed out in the claims hereinafter.

According to the present invention the cones are separate from the forks, and the means shown in Figs. 1 to 5, inclusive, for preventing their rotation are, the non-circular projections on the said cones, and the corresponding openings formed for them in the lower ends of the fork. While these means are entirely satisfactory, and preferred to any others, still, I desire to have it understood that my invention is not limited to them, but, in its broadest aspect, comprehends any means for accomplishing the result. Another way of doing it is to provide the cone with a notch $c'$ and provide a washer H, having a tongue $h$ fitting in said notch, and in a notch formed in the fork whereby the washer is held against turning, as shown in Fig. 6.

It is a well known fact that the underneath sides of cones usually wear faster than any other portions, and in order to bring different portions of the cone in position to receive this wear, and thus in a measure equalize it on all parts of the cone, it is necessary that the cones be made separate from the fork, and attached thereto by means which will permit of their being put in place with one or another portion lowermost.

As shown in Fig. 1 the means for adjusting the cones toward or from each other consists of the axle B having the right and left threads $b$ on which the cones fit, the axle being provided at its extremities with notches $b'$ for receiving a screw-driver, or other implement, by which it may be turned in one direction for moving the cones toward each other, and in the other direction for moving them away from each other. I desire to have it understood, however, that my invention is not necessarily limited to this particular means for adjusting the cones, but comprehends other means, such, for example, as are shown in Fig. 5. In this figure one of the cones $C'$ is provided with a perforation without threads, and fits upon a smooth portion of the axle $B'$, said axle being provided with a shoulder $B^2$ which bears against the inner face of the cone and holds it against endwise movement thereon. At its other end the axle is threaded as at $B^3$, and the other cone C' is screwed onto this threaded portion. It will be observed that with this arrangement the cones can be adjusted toward or from each other as may be desired by simply turning the axle in one direction or the other, as already described with relation to Fig. 1. In Fig. 1 the invention is shown applied to a ball bearing, while in Figs. 4 and 5 it is shown applied to cone bearings.

The axle B″ shown in Fig. 4 differs from the axle shown in Fig. 1 only in that the former has at its extremities threads, for the reception of lock nuts F, that are pitched in the same direction, so that a wrench applied to one of the nuts will have a tendency to prevent the axle from turning while the other nut is being turned on.

The term "cone" has been herein applied to the part C, but it will be observed that said part is not a cone in any strict sense of the term, and I desire to have it understood, therefore, that this term is used in this specification in a liberal sense, and is intended to comprehend the adjustable part of a journal bearing.

Having thus described my invention, the following is what I claim as new therein and desire to secure by Letters Patent:

1. In a journal bearing, the combination of a hub having a pair of sockets, a pair of cones occupying said sockets and having openings through them, an axle extending through the openings of the cones and being capable of turning therein, said axle having features which engage the cones and prevent them from sliding endwise upon it, and which features, when the axle is revolved, move the cones toward or from each other, and a fork separable from the cones, the fork and cones having engaging features whereby when in use the cones are absolutely prevented from turning and whereby when the parts are separated the cones may be turned to bring different portions of them in position to receive the greatest wear, substantially as set forth.

2. In a journal bearing the combination with a hub having a pair of sockets, of a pair of cones each occupying one of said sockets, means for absolutely preventing both of said cones from rotating, and an axle having right and left threads on which said cones fit, so that by turning the axle the cones are moved relatively to each other, substantially as set forth.

3. In a journal bearing the combination with a hub having a pair of sockets, of a pair of cones C having the non-circular portions $c$, one of said cones occupying each of said sockets, the fork E having non-circular openings in which the non-circular portions of the cones fit, and the revoluble axle B having right and left threads $b$ on which said cones are screwed, whereby the cones may be moved toward or from each other by rotating the axle, substantially as set forth.

A. W. KIRSCH-KING.

Witnesses:
　JNO. F. SCHNARRENBERGER,
　JACOB C. TURNES.